United States Patent [19]
Brinker et al.

[11] Patent Number: 5,948,482
[45] Date of Patent: Sep. 7, 1999

[54] AMBIENT PRESSURE PROCESS FOR PREPARING AEROGEL THIN FILMS RELIQUIFIED SOLS USEFUL IN PREPARING AEROGEL THIN FILMS

[75] Inventors: Charles Jeffrey Brinker, Albuquerque, N.Mex.; Sai Sivasankaran Prakash, Minneapolis, Minn.

[73] Assignee: University of New Mexico, Albuquerque, N.Mex.

[21] Appl. No.: 08/530,543

[22] Filed: Sep. 19, 1995

[51] Int. Cl.$^6$ .................................. B05D 1/18; B05D 3/00
[52] U.S. Cl. .................. 427/430.1; 427/226; 427/245; 427/246; 427/397.7; 252/315.2; 252/315.6; 252/315.7; 106/287.12; 106/287.16; 501/12; 501/104
[58] Field of Search .................................. 427/430.1, 226, 427/245, 246, 397.7; 252/315.2, 62, 315.6, 315.7; 501/12, 104; 106/287.12, 287.16

[56] References Cited

U.S. PATENT DOCUMENTS

| | | | |
|---|---|---|---|
| 4,652,467 | 3/1987 | Brinker et al. | 427/246 |
| 4,929,278 | 5/1990 | Ashley et al. | 106/287.12 |
| 5,470,802 | 11/1995 | Gnade et al. | 437/238 |
| 5,565,142 | 10/1996 | Deshpande et al. | 252/315.2 |

OTHER PUBLICATIONS

D.M. Smith, R. Desphande, and C. J. Brinker, "Preparation of Low Density Aerogels at Ambient Pressure" in *Better Ceramics Through Chemistry V*, Eds. M. J. Hampden-–Smith, W. G. Klemperer, C. J. Brinker (Materials Research Society, Pittsburgh, 1991) 567–572.

R. Despande, D–W. Hua, D. M. Smith, and C. J. Brinker, J. Non–Cryst. Solids 144 (1992) 32–44.

S. S. Prakash, C. J. Brinker, A. J. Hurd, and S. M. Rao, Nature 374 (1990) 439–443.

*Primary Examiner*—Shrive Beck
*Assistant Examiner*—Bret Chen
*Attorney, Agent, or Firm*—Jagtiani & Associates

[57] ABSTRACT

A method for preparing aerogel thin films by an ambient-pressure, continuous process. The method of this invention obviates the use of an autoclave and is amenable to the formation of thin films by operations such as dip coating. The method is less energy intensive and less dangerous than conventional supercritical aerogel processing techniques.

12 Claims, 5 Drawing Sheets

AMBIENT PRESSURE PROCESS FOR PREPARING AEROGEL THIN FILMS RELIQUIFIED SOLS USEFUL IN PREPARING AEROGEL THIN FILMS

The United States Government has rights in this invention pursuant to Contract No. DE-AC04-76DP00789 between the Department of Energy and American Telephone and Telegraph Company.

BACKGROUND OF THE INVENTION

1. Field of the Invention

The present invention relates generally to the field of aerogels, and more particularly to a method of preparing aerogel thin films at ambient pressure.

Aerogels are unique solids with up to 99% porosity. Such large porosities confer a number of useful properties on aerogels including high surface area (often exceeding 1000 $m^2/g$), low refractive index (n<1.1), low dielectric constant, low thermal-loss coefficient (<0.5 $W/(m^2K)$, and low sound velocity (100 m/s). These properties lead in turn to potential thin-film applications such as: ultra-low dielectric constant interlayer dielectrics, optically reflective and antireflective coatings, flat panel displays, sensors, superinsulated architectural glazing, catalyst surfaces, and acoustic impedance matching devices. To date, however, the potential of aerogels has not been realized in these applications, because conventional supercritical aerogel processing is energy intensive, often dangerous, and, most important, not amenable to continuous or semi-continuous thin-film forming operations such as dip-coating.

With thermal conductivities as low as 0.02 W/mK, some of the more promising potential applications of aerogel films are based on their insulating properties. Radiative-diode systems which effectively transmit solar radiation but prevent thermal leakage, energy-efficient greenhouses, translucent insulation for solar collectors, and thermally efficient architectural glazing are some of the possibilities. The use of aerogels in such applications is especially attractive due to environmental concerns over conventional insulating materials. Since the original synthesis of silica aerogel in 1931, aerogels have been prepared from both inorganic and organic precursor gels over wide compositional ranges. The conventional means of aerogel synthesis entails placing a liquid-filled gel in an autoclave and increasing the temperature and pressure until the critical temperature and pressure of the pore liquid are exceeded (for ethanol $T_c$=243° C. and $P_c$=63 bar). The supercritical pore fluid is then removed from the gel while the temperature is maintained above critical. It is desired that the pore fluid be removed under supercritical conditions where there are no liquid/vapor interfaces. In this case the capillary pressure $P_c$ developed in the liquid equals zero:

$$P_c = -2\gamma_{LV} \cos\theta / r_p = 0 \tag{1}$$

where $\gamma_{LV}$ is the liquid-vapor surface tension, $\theta$ is the wetting angle, and $r_p$ is the pore radius. Drying occurs often with little or no shrinkage, essentially preserving the wet gel structure. An alternate low-temperature method involves replacing the original pore fluid with liquid $CO_2$ and then removing $CO_2$ above its critical point ($T_c$=31° C., $P_c$=73 bar).

Although present aerogels exhibit unique properties, they suffer several drawbacks for widespread commercial applications, viz.: 1) High pressures (and often, temperatures) required for supercritical processing result in high processing and capital equipment costs and lead to safety and health concerns. 2) For the high-temperature extraction process, significant chemical and physical changes occur during drying that degrade properties (e.g., coarsening of microstructure), whereas the low-temperature process limits the choice of pore fluids to those miscible with $CO_2$. 3) Aerogels prepared by present processing techniques are hydrophilic and often reactive (alkoxylated surfaces). Condensation of moisture in the pores subjects the gel to capillary stresses that ultimately degrade the structure and the associated insulating properties. 4) Supercritical drying is normally a batch operation performed within the constraints of an autoclave. This precludes continuous forming operations such as thin-film coating and fiber drawing and limits the size of the article to the size of the autoclave.

When drying a gel by evaporation of the pore fluid, the curvature of liquid-vapor menisci developed at the drying surfaces causes the liquid to be in tension. The magnitude of the tension is expressed by the Laplace equation (Eq. 1). This tension is supported by the solid phase causing it to shrink. Shrinkage stops when the tension in the liquid is balanced by the network modulus $K_p$, which increases during shrinkage as a power law, $K_p = K_o (V_o/V)^m$, where $K_o$ is the initial bulk modulus of the gel, $V_o$ and V are the initial and current gel volumes, respectively, and m=3.0–3.8. At the critical point where shrinkage stops, the shrinkage of the network $\epsilon_v$ attributable to drying is:

$$\varepsilon_v = \left(\frac{1-\phi_S}{K_p}\right)\left(\frac{-\gamma LV \cos\theta}{r_p}\right) \tag{2}$$

where $\phi s$ is the volume fraction solids. Strategies to minimize drying shrinkage therefore include increasing the modulus, decreasing the surface tension, and increasing the wetting angle. Condensation reactions that accompany shrinkage normally cause the drying shrinkage to be irreversible, i.e., as hydroxyl-terminated surfaces are brought in contact, they undergo dehydration to produce M-O-M bonds. These covalent bonds preserve the shrunken state of the gel after complete removal of the pore fluid and elimination of the capillary pressure. An additional strategy to minimize shrinkage therefore is to render the gel surfaces unreactive towards condensation, allowing any drying shrinkage to be reversible.

SUMMARY OF THE INVENTION

The present invention is a method for preparing aerogel thin films by an ambient-pressure, continuous process obviating the use of an autoclave. The method is amenable to the formation of thin films by operations such as dip coating.

BRIEF DESCRIPTION OF THE DRAWINGS

The accompanying drawings which are incorporated in, and form part of, the specification illustrate embodiments of this invention and, together with the description, serve to explain the principles of the invention.

DESCRIPTION OF THE PREFERRED EMBODIMENTS

Ambient Pressure Aerogel Process

Figure 1:
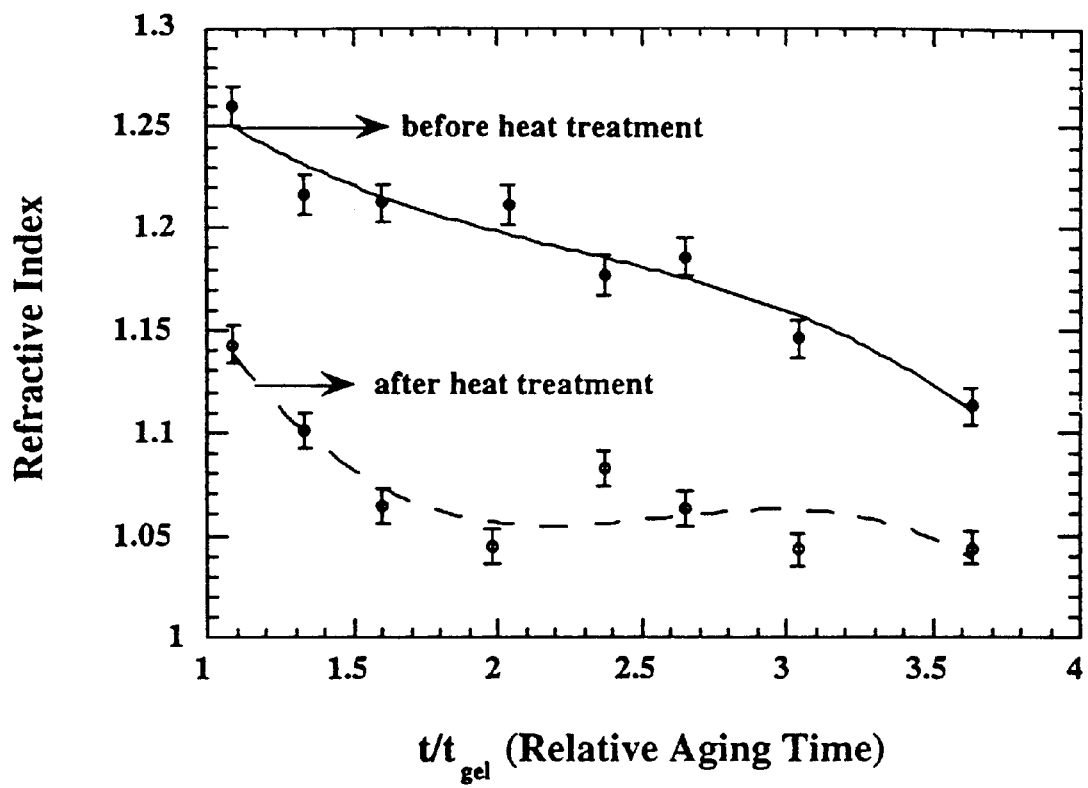
FIG. 1 shows the influence of aging on film porosity.

The ambient pressure aerogel process comprises:
1) sol or gel preparation,
2) sol or gel aging
3) surface derivatization,
4) (optionally) fluid exchange,
5) (optionally) sonication with an ultrasonic probe,
6) thin film deposition, and
7) (optionally) thermal/chemical treatment.

Each of these steps is discussed in turn below.

Sol or gel preparation—Appropriate sols for this invention include so-called particulate and polymeric sols. Sol compositions include but are not limited to aqueous or alcoholic colloidal dispersions of ceramics such as $SiO_2$, $Al_2O_3$, $TiO_2$, $ZrO_2$, and their hydrated or alkoxylated derivatives; partially or fully hydrolyzed metal alkoxides ($M(OR)_n$), where M is a metal and R is an organic ligand, preferably an alkyl group; partially or fully hydrolyzed organically substituted metal alkoxides ($R'_xM(OR)_{n-x}$, where R' is a non-hydrolyzable organic ligand), metals, metal carbides, metal nitrides, metal chalcogenides, and other colloidal dispersions already well understood in the art. The fluid component of the sol includes but is not limited to water, alcohol, or other organic fluids such as hexane, cyclohexane, toluene, tetrahydrofuran, actetonitrile, methoxyethanol, or multicomponent (preferably miscible) fluid mixtures. The only practical requirements of the sol are that it remain stable, i.e., not precipitate during the coating operation, and that its viscosity and concentration be appropriate for the pertinent coating operation.

As will be obvious in the following discussion, gelation of the sol can facilitate subsequent processing steps such as aging, solvent exchange, and silylation. Gelation of the sol can be accomplished by a variety of techniques familiar to practitioners of the art including aging, addition of acid or base, addition of salt, application of heat, or application of light.

Sol or gel aging—Aging refers to storage of the sol or gel normally in a quiescent state under conditions appropriate to further the extent of hydrolysis, condensation, and/or ripening. In the context of this invention, aging is used prior to gelation to grow and strengthen primary sol particles, clusters, or aggregates (this may lead to gelation, depending on sol concentration) and/or after gelation to strengthen the gel network. For sol clusters characterized by a mass fractal dimension, cluster growth increases the average cluster porosity. Thus aging may be used to increase the resistance ($K_p$) of the network to collapse under the applied capillary pressure developed during drying and/or to increase the porosity of the primary structural units contained in the sol, gel, and ultimately the film. Appropriate aging conditions include but are not limited to 25–90° C. and proton concentrations of $10^{-1}$ to $10^{-12}$ M.

Surface derivatization—In the context of the present invention, surface derivatization refers to the reaction of reactive terminal sites existing on the surfaces of the sol clusters or gel such as hydroxide, alkoxide, halide, etc. with molecules, oligomers, or polymers that render the surface unreactive toward further condensation and/or modify the liquid-solid contact angle $\theta$. Appropriate derivatizing agents include but are not limited to organofunctional silanes such as chlorosilanes ($R'_xSiCl_{4-x}$, where R' is preferably an alkyl or fluoroalkyl ligand, e.g. $[CH_2]_nCF_3$); alkoxysilanes ($R'_xSi(OR)_{4-x}$, where R is an alkyl ligand and R' is a non-hydrolyzable ligand such as alkyl, fluoroalkyl, or amine); alcohol amines, e.g. triethanol amine; carboxylic acids, e.g. acetic acid; or β-diketonates, e.g. acetylacetonate. Reactions with the sol or gel surfaces may be carried out in organic solvent or water. Alternatively the derivatizing agents may be partially hydrolyzed and reacted as oligomers. The derivatized surface may exist as a monolayer or as a multilayer. Surface derivatization may also be at least partially accomplished during the sol preparation step when organic substituted metallic alkoxides, $R'_nM(OR)_{z-n}$, are used as precursors.

Fluid exchange—Fluid exchange may be performed in the sol or gel state to alter the fluid surface tension $\gamma_{LV}$ and/or solid-liquid contact angle $\theta$, promote or retard aging, alter the evaporation rate during film deposition, and influence the extent of surface derivatization. For gels, fluid exchange may be accomplished by repeated washing of the gel in excess volumes of the fluid of choice. For sols, fluid exchange may be performed by distillation of lower boiling point fluids or azeotropic compositions along with replenishment of the fluid of choice. Appropriate fluids include but are not limited to: water, alcohols, hexane, cyclohexane, toluene, acetonitrile, acetone, nitromethane, dioxane, or mixtures thereof.

Sonication—Sonication is used to transform a gel to a fluid sol suitable for coating operations such as dipping or spinning. Sonication may be accompanied by fluid addition to optimize the sol concentration and rheological behavior. The sonication process may simply disperse physical gels bound together by electrostatic or van der Waals forces, or it may serve to break covalent metaloxane bonds. The latter situation will progressively reduce cluster size and molecular weight in polymeric sols.

Film deposition—Film deposition may be performed by any suitable coating operation such as dip-coating or drainage, spin-coating, Mayer rod coating, slot coating, and other liquid-to-solid coating operations familiar to practitioners of the art. During the coating operation, the solid phase (particles, polymers, clusters) is concentrated by evaporation of the fluid component of the sol, leading to the creation of a physical or chemical gel. The gel network is subjected to a capillary pressure specified by Eq. 1, the magnitude (and sign) of which depends on the surface tension, wetting angle, and pore size. These factors depend in turn upon the nature of the solvent, the choice of derivatizing agent(s), and the extent of surface coverage of the derivatizating agent(s). For wetting fluids ($\theta<90°$), the initial shrinkage of the gel network in response to the capillary pressure depends on the magnitude of the capillary pressure and modulus of the gel. As the liquid-vapor menisci recede into the gel interior, the capillary pressure is reduced, ultimately to zero, upon complete evaporation of the sol fluid. It is preferred according to the processes of the invention that the gel network "springback" as the capillary pressure is diminished. Springback of the network, as confirmed by ellipsometric imaging, largely restores the porosity of the original gel network. In this sense the preferred embodiment of the invention should be considered an aerogel process, i.e. drying is accomplished with little net collapse of the gel network.

Thermal/chemical treatment—Thermal treatment of the as-deposited coatings may be used to complete the drying process, partially consolidate the film through continued condensation reactions, partially or fully consolidate the film through sintering, pyrolyze residual organic groups, and/or perform oxidation or reduction. Of these processes, pyrolysis of residual organic ligands increases the film porosity. In this sense the derivatizing agent(s) serve as pore "templates" in addition to their function as a means to control the porosity of the as-deposited films. Variation of the size and shape of the organic ligand may be used to influence the size and shape of the corresponding pore created by ligand pyrolysis. Variation of the organic ligand surface coverage may be used to control the volume fraction porosity of the film. Optionally, chemical treatments such as ozonolysis, oxygen plasma, photolysis, and selective dissolution can be used to remove residual organic constituents in order to confer additional porosity on the film. Obviously more than one organic ligand may be utilized in the synthesis and/or derivatizing steps to arrive at a composite structure in which some organic groups are removed to create porosity, while some are retained to provide hydrophobicity.

Control of Film Porosity for As-deposited and Heat Treated Films

The extents of both shrinkage and springback, and hence the porosity of the film, are conveniently controlled through: i) choice and surface coverage of derivatizing or modifying agent(s); ii) aging time; iii) sonication time employed to re-liquefy the gel; iv) composition and temperature of sol fluid that exists at the final stage of drying; v) coating rate, e.g., withdrawal rate during dip-coating; and vi) heat treatment (if any) employed following coating.

To achieve high porosity, rather high extents of surface coverage are preferred so that little further condensation of the gel network accompanies drying. In this situation the deformed gel exhibits springback, largely restoring the porosity of the wet gel. Porosity increases with extent of surface coverage up to a point beyond which the refractive index begins to increase. The latter behavior is due to the fact that a sufficient portion of non-derivatized hydroxyl groups must be maintained in the sol (prior to film deposition) to insure that gelation accompanies film deposition.

Aging time is used to strengthen the primary structural units comprising the sol. Increased aging time (in the sol or gel states) prior to film deposition leads to a decrease in film refractive index because, for a particular drying stress $P_c$, the gel network undergoes less shrinkage and exhibits almost perfectly reversible springback.

Sonication disrupts the gel network through breakage of physical or chemical bonds. For sols composed of fractal polymeric clusters, sonication reduces the cluster size and porosity and increases average cluster modulus. Increasing sonication time causes film porosity to increase then decrease due to a trade-off between increasing cluster modulus and decreasing cluster porosity.

The composition of the sol fluid component(s) determines the values of the liquid-vapor surface tension $\gamma_{LV}$ and wetting angle $\theta$, ultimately establishing the magnitude of the drying stress, $P_c$, exerted on the gel network. A reduction in $\gamma_{LV}$ and/or an increase in $\theta$ reduce the drying shrinkage experienced by the gel at the most compacted state (immediately prior to springback). As in bulk materials, if $P_c$ is eliminated, the gel film should experience no drying shrinkage. This situation may be realized for derivatized sols deposited from multicomponent organic/water fluids, e.g. alcohol/water. In this case preferential evaporation of the more volatile fluid (alcohol) enriches the pore fluid in the less volatile fluid (water). Since water does not wet hydrophobic surfaces, the wetting angle $\theta$ could approach 90° (cos 90°=0), causing $P_c$ to approach zero. For the case, cos $\theta$<0 (non-wetting liquids), the sign of the capillary pressure would be reversed, causing the gel to expand upon drying.

For coating operations such as dip-coating, the film thickness increases with the coating rate (dipping speed). Since thicker films require longer drying times, an increase of the dipping speed serves in effect to increase the aging time prior to the development of the capillary pressure. Film refractive index therefore decreases with dipping speed. For spin-coating, increasing the spinning frequency decreases the film thickness and associated drying time. This should cause film refractive index to increase.

Heat treatments employed following film deposition may be used to partially or completely remove the derivatizing agents. Pyrolysis of organic groups creates additional porosity in the film reducing the refractive index/dielectric constant. At sufficiently high temperatures, sintering of the films can occur, increasing the refractive index/dielectric constant.

EXAMPLE 1

This example describes an optimized process of preparation of silica aerogel films at ambient pressure and temperature. Silicate sols were prepared from tetraethoxysilane (TEOS) dissolved in ethanol using a two-step acid/base catalyzed procedure (referred to as B2) In the first step, TEOS, EtOH, $H_2O$ and HCl were combined in the molar ratios $1.0:3.8:1.1:7.0\times10^{-4}$ and refluxed at 60° C. for 90 min (stock solution). In the second step, 0.05M $NH_4OH$ stock solution and EtOH were combined in the volume ratios 1:10:44. Typically, 55 ml of the B2 sol was prepared in a 125 ml Nalgene container and allowed to gel and age at 50° C. These sols had an approximate gelation time of 46 hours, and were left in the 50° C. aging oven for a total time of at least 92 hours ($t/t_{gel}$ >2).

The aged gels were then subjected to a pore fluid washing procedure, wherein the original pore fluid was replaced with hexane, and a silylating reagent (trimethylchlorosilane) in hexane was used to derivatize the surface hydroxyl groups with trimethylsilyl groups. The washing steps (performed at 50° C.) are described below:

(1). The aged gels were washed in a surplus of fresh ethanol three times in three hours.

(2). These were then washed in a surplus of fresh hexane two times in four hours.

(3). Silylating solution was prepared by mixing 5 volumes of trimethylchlorosilane with 95 volumes of hexane. The gels were then soaked in surplus silylating solution for at least 20 hours.

(4). The surface-derivatized gels were then washed again in a surplus of fresh hexane two times in two hours.

The surface-derivatization was followed by a reliquification of the gel using ultrasound (20 kHz frequency, 475 watts maximum power). Here, additional hexane was added to the wet gel from the previous step. Sonication was performed for ~20 minutes. The amount of additional hexane added dictated the final thickness of the film. We were able to prepare aerogel films in the thickness range 0.1–1.8 μm, by controlling amount of hexane in the reliquified sol (either before the sonication step or by partial evaporation of the solvent after sonication). Typically, ~50–80 ml of additional hexane was added to the wet gel, originally prepared from 55 ml of B2 sol. The reliquified sol was then dip-coated at ambient pressure and temperature on silicon substrates, to give a film of volume percent porosity >60%. Due to experimental inconsistencies, the reliquified sol sometimes phase separates, in which case, the denser component appearing as a clearer liquid and in very small volume in comparison to the supernatant is discarded, and the supernatant is used to coat the films.

EXAMPLE 2

The following describes the enhancement of film porosity obtained from the previous example, by a simple low-temperature heat-treatment procedure. The films prepared from Example 1 (porosity of ~60 volume %) were placed directly in an oven pre-heated to 450° C., pyrolyzed at 450° C. for one hour and then removed to room temperature. The films after pyrolysis showed porosity >90%.

EXAMPLE 3

The following describes the influence of gel aging times (prior to surface derivatization) on the final porosity of the films. The relative aging time, i.e., $$\left[\frac{t}{t_{gel}} \equiv \frac{\text{total (gelation + aging) time}}{\text{gelation time}}\right]$$

was varied between and 1 and 3.6, and its influence on refractive index (related to volume % porosity by the Lorentz-Lorenz relationship) is shown in FIG. 1 and Table 1. Third-order polynomial fits are applied to the data. Here, films prepared both by Examples 1 and 2 are shown (the "as-deposited" and "450° C.-treated" films, respectively). The refractive index drops with increased aging for both cases, but flattens out faster in the latter case. We presume the aging increases the strength of the gel-network, enabling it to better withstand the capillary forces during drying. As indicated by the data, control over film porosity in the range ~40–90% could be exercised solely by varying the aging time, with and without the heat-treatment step.

TABLE 1

| OPTIMIZATION STEP [PARAMETER] | PARAMETER VALUE | REFRACTIVE INDEX | VOLUME % POROSITY | COMMENTS |
|---|---|---|---|---|
| 1. AGING | 1.09 | 1.26 | 40.20 | As deposited |
| [Ratio of total time to | 1.33 | 1.216 | 49.76 | film |
| gelation time] | 1.60 | 1.212 | 50.64 | |
| | 2.04 | 1.211 | 50.86 | |
| | 2.37 | 1.177 | 58.44 | |
| | 2.65 | 1.186 | 56.42 | |
| | 3.04 | 1.146 | 65.47 | |
| | 3.63 | 1.113 | 73.08 | |
| | 1.09 | 1.143 | 66.16 | |
| | 1.33 | 1.101 | 75.88 | |
| | 1.60 | 1.064 | 84.60 | |
| | 1.98 | 1.045 | 89.13 | 450° C.-treated |
| | 2.37 | 1.083 | 80.11 | film |
| | 2.65 | 1.063 | 84.84 | |
| | 3.04 | 1.043 | 89.61 | |
| | 3.63 | 1.044 | 89.37 | |

EXAMPLE 4

Figure 2:
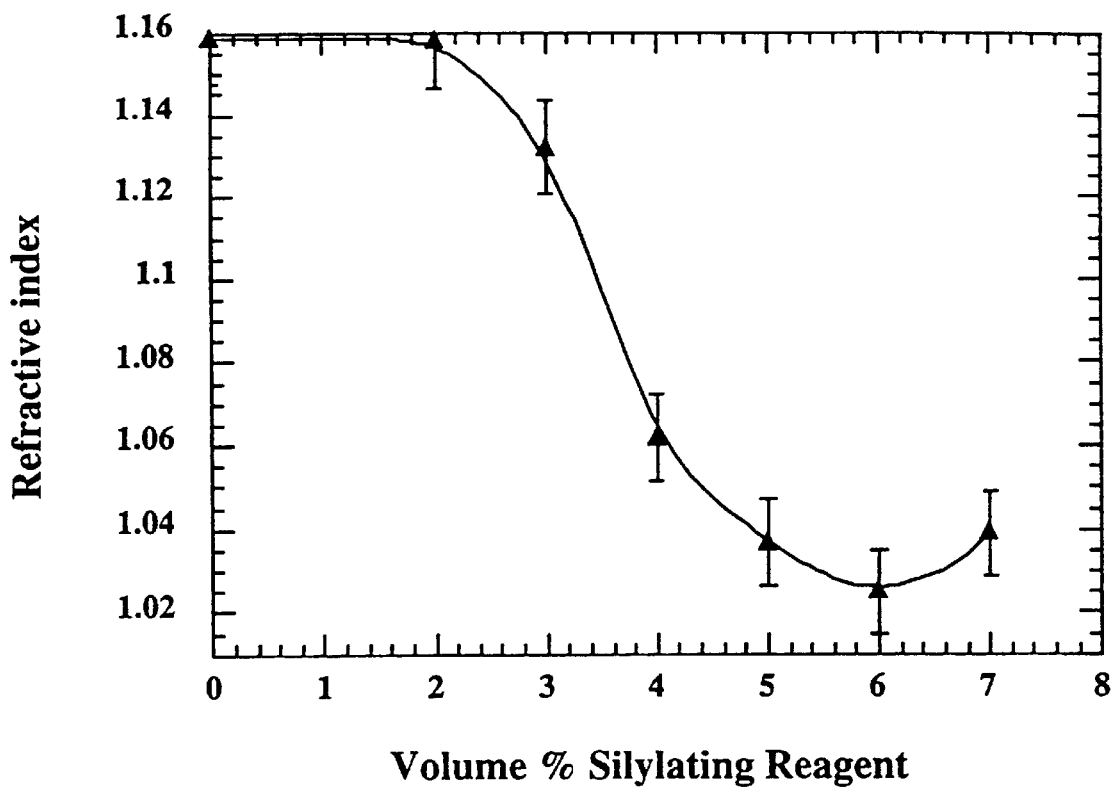
FIG. 2 shows the influence of extent of silylation on film porosity.

This example describes the influence of the extent of surface derivatization on the refractive index of the films prepared using Example 2. The parameter was the concentration of the silylating solution (trimethylchlorosilane in hexane) used, and was varied between 0 and 7% (volume basis). This is shown in FIG. 2 and Table 2. The "as-deposited" films (using Example 1) showed porosities of ~30% and ~60% for the 0% and 5% concentrations, respectively. The data indicate a smooth drop in refractive index with extent of surface derivatization, corresponding to a greater extent of springback during film formation. The increase in refractive index past the minimum in the plot is accompanied by film cracking. In this case, control over film porosity in the range ~30–95% could be exercised solely by varying the concentration of silylating solution, with and without the heat-treatment step.

TABLE 2

| OPTIMIZATION STEP [PARAMETER] | PARAMETER VALUE | REFRACTIVE INDEX | VOLUME % POROSITY | COMMENTS |
|---|---|---|---|---|
| 2. SILYLATION | 0.00 | 1.159 | 62.51 | 450° C.-treated |
| (Volume % silylating | 2.00 | 1.158 | 62.74 | film |
| reagent in hexane] | 3.00 | 1.132 | 68.69 | |
| | 4.00 | 1.062 | 85.08 | |
| | 5.00 | 1.037 | 91.05 | |
| | 6.00 | 1.025 | 93.94 | |
| | 7.00 | 1.039 | 90.57 | |

EXAMPLE 5

Figure 3:
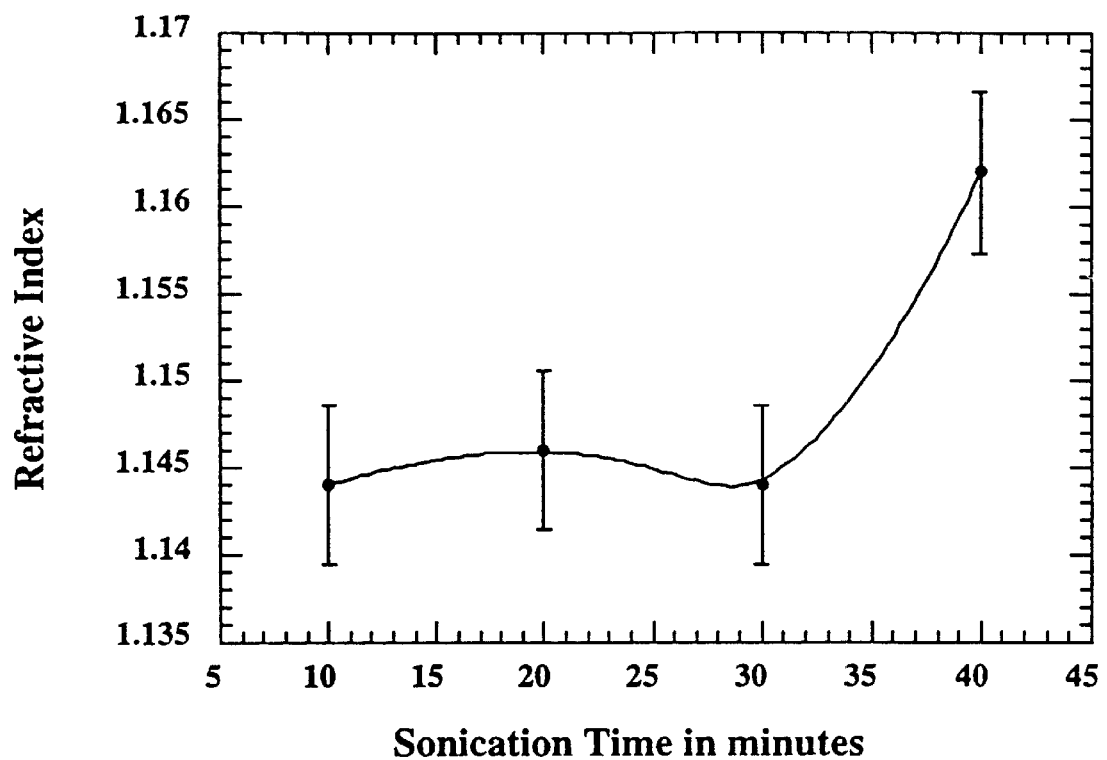
FIG. 3 shows the influence of sonication time on film porosity.

This example indicates the influence of sonication time on refractive index of films prepared by Example 1 (shown in FIG. 3 and Table 3). Surplus hexane was added to the gels from the surface-derivatization step, and they were subjected to varying times of sonication in the range 10–40 min. The sonicator described in Example 1 was used. The data show an increase in refractive index with sonication time.

TABLE 3

| OPTIMIZATION STEP [PARAMETER] | PARAMETER VALUE | REFRACTIVE INDEX | VOLUME % POROSITY | COMMENTS |
|---|---|---|---|---|
| 3. SONICATION | 10.00 | 1.144 | 65.93 | As-deposited |
| [Time in minutes] | 20.00 | 1.146 | 65.47 | film |
| | 30.00 | 1.144 | 65.93 | |
| | 40.00 | 1.162 | 61.83 | |

EXAMPLE 6

Figure 4:
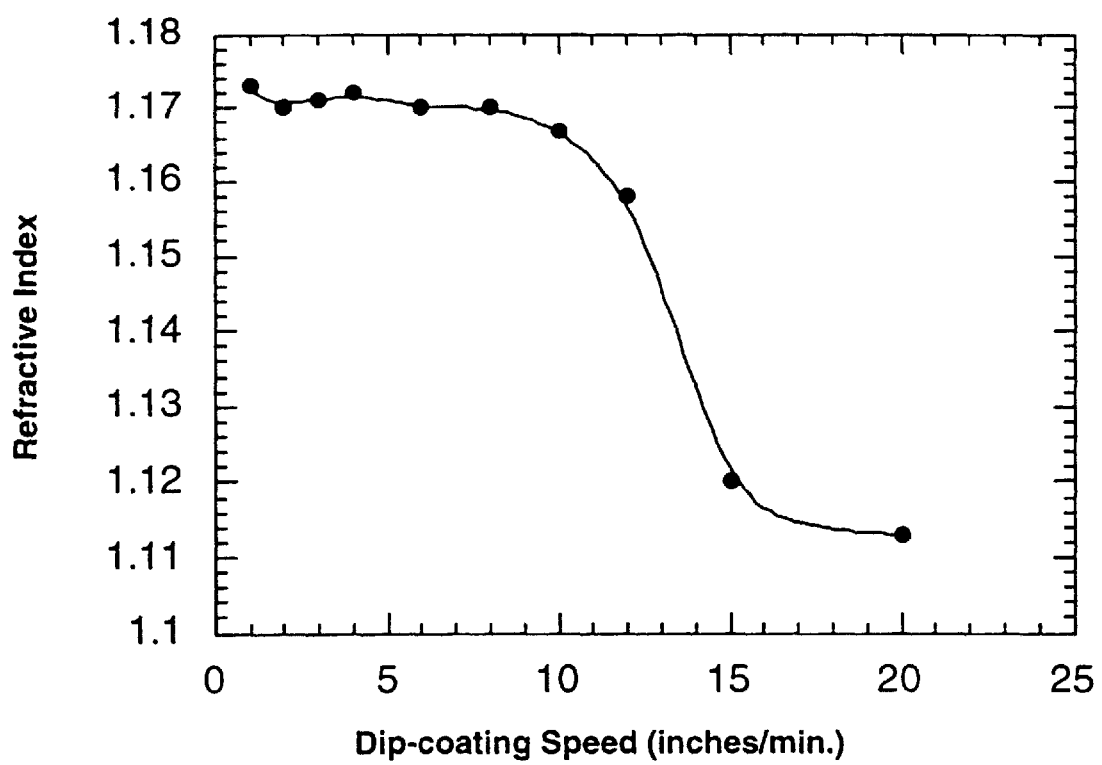
FIG. 4 shows the influence of dip-coating speed on film porosity.

FIG. 4 and Table 4 show the influence of dip-coating speed on refractive index of films prepared by Example 1. The porosity remains constant for speeds <12 inch/min, but drops sharply with further increase in speed. An increase in speed past 20 inch/min is accompanied by an increased risk of film cracking. Refractive index varies between ~1.173–1.113, when speeds in the range 1–20 inch/min are used.

EXAMPLE 7

Figure 5:
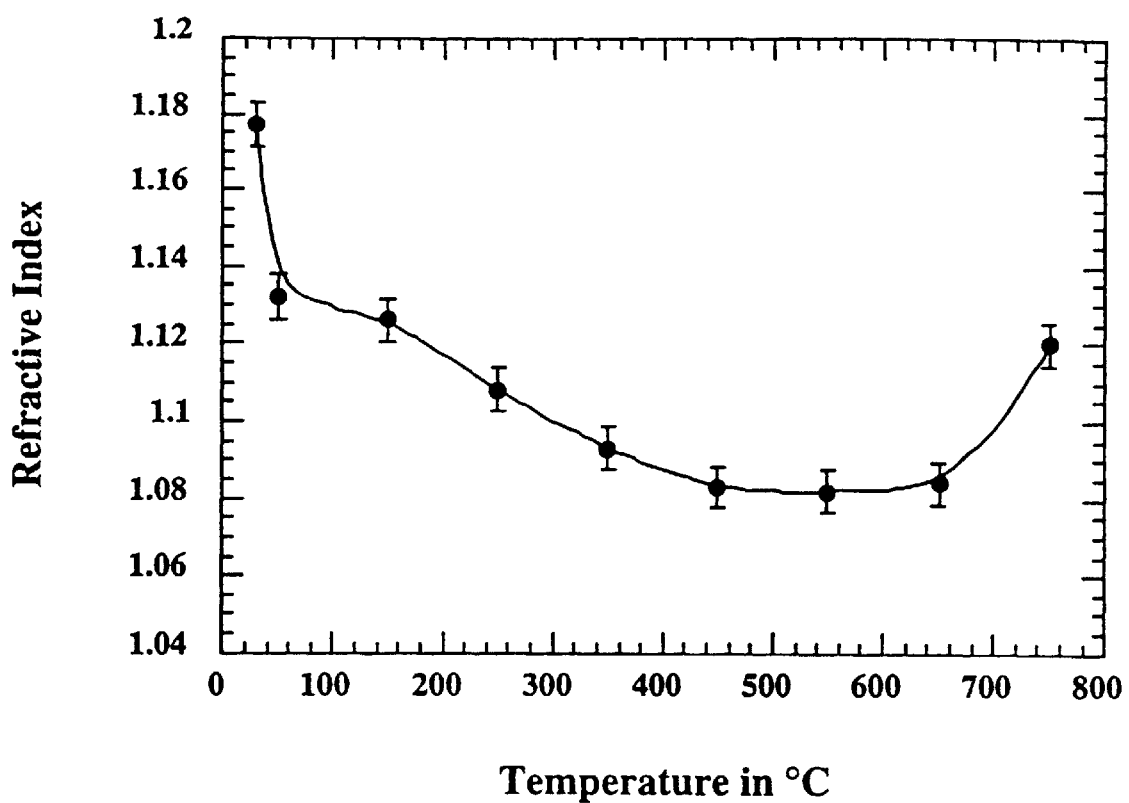
FIG. 5 shows the influence of pyrolysis temperature on film porosity.

The influence of maximum pyrolyzing temperature (30–750° C.) on films prepared by Example 2 is shown in FIG. 5 and Table 5. This indicates a drop in refractive index with increasing temperature up to 450° C. (due to the creation of porosity by pyrolysis of organic groups), a plateau between 450–650° C., and an increases beyond 650° C. due to sintering. The refractive index varies between ~1.177–1.083 with temperature in the range 30–450° C. The influence of heating/cooling rates was also studied for rates 1° C./min, 10° C./min and direct placement of the film in a pre-heated oven (described in Example 2). Scatter in refractive index across the film increased with increasing rates, but the maximum scatter was less than 1%. Variation of hold time indicated an increase in refractive index for times greater than one hour.

TABLE 4

| OPTIMIZATION STEP [PARAMETER] | PARAMETER VALUE | REFRACTIVE INDEX | VOLUME % POROSITY | COMMENTS |
|---|---|---|---|---|
| 4. DIP-COATING | 1.00 | 1.173 | 59.34 | As-deposited |
| [Dipping speed | 2.00 | 1.17 | 60.02 | film |
| in inches per minute] | 3.00 | 1.171 | 59.79 | |
| | 4.00 | 1.172 | 59.57 | |
| | 6.00 | 1.17 | 60.02 | |
| | 8.00 | 1.17 | 60.02 | |
| | 10.00 | 1.167 | 60.70 | |
| | 12.00 | 1.158 | 62.74 | |
| | 15.00 | 1.12 | 71.46 | |
| | 20.00 | 1.113 | 73.08 | |

TABLE 5

| OPTIMIZATION STEP [PARAMETER] | PARAMETER VALUE | REFRACTIVE INDEX | VOLUME % POROSITY | COMMENTS |
|---|---|---|---|---|
| 5. PYROLYSIS | 50.00 | 1.132 | 68.69 | Rapid |
| [Temperature in ° C.] | 150.00 | 1.126 | 70.07 | heating & |
| | 250.00 | 1.108 | 74.25 | cooling rates |
| | 350.00 | 1.093 | 77.75 | Hold Time |
| | 450.00 | 1.083 | 80.11 | ~ 1 hour |
| | 550.00 | 1.082 | 80.34 | |
| | 650.00 | 1.084 | 79.87 | |
| | 750.00 | 1.12 | 71.46 | |

EXAMPLE 8

This example describes an optimized process of preparation of silica aerogel films at ambient pressure. The only difference between this, and Examples 1 and 2 is that the final pore fluid in the sol used for dip-coating is ethanol as opposed to hexane. In Step 4 of the pore fluid washing procedure of Example 1, the surface-derivatized gels were washed again in a surplus of fresh hexane once in one hour and then in a surplus of fresh ethanol twice in two hours.

The surface-derivatization was followed by a reliquification of the gel using ultrasound. Here, additional ethanol was added to the wet gel from the previous step. Typically, ~30–50 ml of additional ethanol was added to the wet gel, originally prepared from 55 ml of B2 sol. Sonication was performed for ~15 minutes. The reliquified sol was then dip-coated at ambient pressure and temperature on silicon substrates, to give a film of mean refractive index of 1.187 (porosity ~56 volume %).

The above films were placed directly in an oven preheated to 450° C., pyrolyzed at 450° C. for one hour and then removed to room temperature. The films after pyrolysis showed mean refractive index of 1.110 (porosity ~76%).

The examples discussed above are cited to illustrate particular embodiments of this invention. It is contemplated that the use of the invention may involve components having different forms and compositions. It is intended that the scope of the invention be defined by the claims appended hereto.

What is claimed is:

1. A method for preparing a reliquified sol comprising the steps of:
   (a) forming a colloidal sol;
   (b) aging the sol to form a gel;
   (c) derivatizing the surface of the gel with non-hydrolyzable organic substituents in a non-aqueous medium; and
   (d) applying sonication to the derivatized gel in a non-aqueous medium to form a reliquified sol capable of being coated on a substrate to form a film requiring substantially no subsequent additional drying and having a porosity greater than about 50 volume %.

2. The method of claim 1 wherein the colloidal sol comprises one or more metal oxide, metalloid oxide, hydroxide, alkoxide, oxohydroxide, or oxoalkoxide.

3. The method of claim 1 wherein the colloidal sol comprises at least one member selected from the group consisting of $SiO_2$, $B_2O_3$, $TiO_2$, $Al_2O_3$, $ZrO_2$, $Y_2O_3$, and their hydrolyzed, alkoxylated, or akylated derivatives.

4. The method of claim 1 where the derivatizing agent is an alcohol amine, a β-diketonate, or a carboxylic acid.

5. The method of claim 1 wherein the colloidal sol is a metal, metal carbide, metal nitride, or metal chalcogenide.

6. The method according to claim 1, wherein the reliquified sol is capable of producing a film having a porosity of at least 80 volume % when coated on a substrate.

7. The method according to claim 1, wherein the reliquified sol is capable of producing a film having a porosity of at least 90 volume % when coated on a substrate.

8. A reliquified sol produced by the method of claim 1.

9. A reliquified sol according to claim 8 capable of producing a film having a porosity of at least 80 volume % when coated on a substrate.

10. A reliquified sol according to claim 8 capable of producing a film having a porosity of at least 90 volume % when coated on a substrate.

11. A reliquified sol according to claim 8 comprising one or more derivatized metal oxide, metalloid oxide, hydroxide, alkoxide, oxohydroxide, or oxoalkoxide.

12. A reliquified sol according to claim 8 comprising at least one member selected from the group consisting of derivatized $SiO_2$, $B_2O_3$, $TiO_2$, $Al_2O_3$, $ZrO_2$, $Y_2O_3$, and their hydrolyzed, alkoxylated, or alkylated derivatives.

* * * * *